US008432950B2

(12) United States Patent
Tanaka et al.

(10) Patent No.: US 8,432,950 B2
(45) Date of Patent: Apr. 30, 2013

(54) RADIO CONTROL TRANSMITTER AND METHOD FOR COMMUNICATION IN THE SAME

(75) Inventors: Masahiro Tanaka, Chouseigun (JP); Eiichi Nishizawa, Chouseigun (JP)

(73) Assignee: Futaba Corporation, Chiba (JP)

( * ) Notice: Subject to any disclaimer, the term of this patent is extended or adjusted under 35 U.S.C. 154(b) by 338 days.

(21) Appl. No.: 12/883,855

(22) Filed: Sep. 16, 2010

(65) Prior Publication Data

US 2011/0103429 A1 May 5, 2011

(30) Foreign Application Priority Data

Sep. 29, 2009 (JP) ................................ 2009-224613

(51) Int. Cl.
*H04B 1/69* (2011.01)
*H04B 1/707* (2011.01)
*H04B 1/713* (2011.01)

(52) U.S. Cl.
USPC ........... 375/133; 375/132; 375/135; 375/136; 375/260; 375/134; 370/330; 370/329; 370/436; 370/437

(58) Field of Classification Search .......... 375/132–137, 375/260; 370/330, 329, 436, 437
See application file for complete search history.

(56) References Cited

U.S. PATENT DOCUMENTS 6,212,221 B1 * 4/2001 Wakayama et al. ........... 375/133
7,483,676 B2 1/2009 Mizukami et al.
2007/0162192 A1 7/2007 Russo
2009/0005167 A1 1/2009 Arrasvuori et al.

FOREIGN PATENT DOCUMENTS

| | | | |
|---|---|---|---|
| CN | 1994015 | A | 7/2007 |
| DE | 9309183 | U1 | 11/1993 |
| JP | 07-31751 | | 2/1995 |
| JP | 09290800 | A | 11/1997 |
| JP | 2006121392 | A | 5/2006 |

OTHER PUBLICATIONS

Japanese Patent Office, Office Action, Application No. JP 2009-224613, Aug. 21, 2012.
Futaba Corporation, Wireless Trainer System WTR-7 Instruction Manual, Jul. 2009.
German Patent Office, Official Action, Serial No. 10 2010 037 820.8, Oct. 18, 2012.

* cited by examiner

*Primary Examiner* — Phuong Phu
(74) *Attorney, Agent, or Firm* — Quarles & Brady LLP

(57) ABSTRACT

A maneuvering signal for controlling a radio-controlled object is transmitted using 2.4 GHz band frequency hopping techniques. In a trainer mode, an instructor's radio control transmitter is configured to transmit the maneuvering signal and receive a trainer signal in each of frame periods by which a frequency is switched in accordance with the frequency hopping scheme. A trainee's radio control transmitter is configured to transmit the trainer signal for each of the frame periods by which a frequency is switched in accordance with the frequency hopping scheme.

7 Claims, 12 Drawing Sheets

RADIO CONTROL TRANSMITTER AND METHOD FOR COMMUNICATION IN THE SAME

CROSS REFERENCE TO RELATED APPLICATIONS

This application claims priority to Japanese Patent Application No. 2009-224613 filed on Sep. 29, 2009, the contents of which are fully incorporated herein by reference.

STATEMENT CONCERNING FEDERALLY SPONSORED RESEARCH OR DEVELOPMENT

Not applicable

BACKGROUND OF THE INVENTION

1. Field of the Invention

The present invention relates to a radio control transmitter for a model and a method for transmission and reception of a signal by this radio control transmitter.

2. Description of the Related Art

An object to be controlled (hereafter referred to as "radio-controlled object) such as a radio control model, and in particular, model air vehicles such as a model airplane and a model helicopter, requires much skill to control its diverse and complex maneuvering, and various radio control transmitters are known that have trainer features so that a beginner can practice without unfortunately letting the air vehicle crush and burn.

As shown in FIG. 10, the trainer features involves two radio control transmitters that are connected to each other via a trainer cable 11, the trainer cable supporting the trainer features to enable a trainer mode.

When the trainer mode is enabled, one of the two interconnected radio control transmitters serves as an instructor's device (i.e., an instructor's radio control transmitter 1A), and the other thereof as a trainee's device (i.e., a trainee's radio control transmitter 1B).

By way of example, the one that has been turned on first may automatically serve as the instructor's radio control transmitter 1A. In this case, the other radio control transmitter may be automatically turned on in response to turning on of the one radio control transmitter serving as the instructor's radio control transmitter 1A to serve as the trainee's radio control transmitter 1B.

When a trainee attempts maneuvering operation for the trainee's radio control transmitter 1B that has been placed in the trainer mode, the trainee's radio control transmitter 1B converts the maneuvering data corresponding to the maneuvering operation into a trainer signal in accordance with a predetermined signal specification, and transmits the trainer signal via the trainer cable 11 to the instructor's radio control transmitter 1A.

The radio control transmitter supporting the trainer features may have a trainer switch. In response to the operation of the trainer switch, the instructor's radio control transmitter 1A can switch between an active mode and a passive mode.

In the passive mode, the maneuvering data in the form of the trainer signal input by the trainee's radio control transmitter 1B is transmitted as the maneuvering signal via an antenna 7 to the radio-controlled object 10. In the passive mode, the radio-controlled object 10 operates in response to the maneuvering operation for the trainee's radio control transmitter 1B.

In contrast, in the active mode, the maneuvering data corresponding to the maneuvering operation for the instructor's radio control transmitter 1A is transmitted as the maneuvering signal to the radio-controlled object 10. This means that the maneuvering data corresponding to the trainer signal by the trainee's radio control transmitter 1B is not transmitted as the maneuvering signal to the radio-controlled object 10.

For example, when the trainee is to practice, an instructor places the radio control transmitter 1A in the passive mode. In the passive mode, the maneuvering signal corresponding to the maneuvering operation made by the trainee using the trainee's radio control transmitter 1B is transmitted to the radio-controlled object 10. Thus, the trainee is allowed to operate the radio-controlled object 10.

However, suppose that the trainee erroneously attempts an operation in the passive mode, making a flight condition of the radio-controlled object unstable, or suppose that a situation necessitates a maneuvering operation that requires skill, which may be a landing operation when the radio-controlled object is an air vehicle.

In such situations, the instructor operates the trainer switch to exit the passive mode and enter the active mode so that, even when the trainee operates the trainee's radio control transmitter 1B, the radio-controlled object 10 does not operate in response to the trainee's maneuvering operation, and instead, it only operates in response to the maneuvering operation by the instructor's radio control transmitter 1A. With the active mode entered, the instructor may attempt maneuvering operation for recovering the radio-controlled object from the unstable flight condition or the landing operation.

In this manner, by virtue of the trainer mode and with the help of the instructor always available, the trainee can practice maneuvering operation safely without crushing the radio-controlled object to the ground or failing in the landing operation.

FIG. 11 illustrates a known system configuration supporting the trainer features.

In the known system shown in FIG. 11, the instructor's radio control transmitter 1A includes a trainer signal receiver 12. The trainer signal receiver 12 is a receiver dedicated to reception of the radio-transmitted trainer signal. The trainer signal receiver 12 is separate from the radio control transmitter as such and is connected to the instructor's radio control transmitter 1A.

In the known system of FIG. 11, when the trainer mode is entered, one of the two devices to which the trainer signal receiver 12 is connected serves as the instructor's radio control transmitter 1A, and the other thereof to which the trainer signal receiver 12 is not connected serves as the trainee's radio control transmitter 1B. Also, the connection between the trainer signal receiver 12 and the instructor's radio control transmitter 1A may be wired connection using a cable.

Further, in the known system configuration of FIG. 11, the trainee's radio control transmitter 1B is configured to emit a radiowave carrying the trainer signal corresponding to the maneuvering operation via the antenna 7. The trainer signal that has thus been emitted is received by the trainer signal receiver 12 and then input to the instructor's radio control transmitter 1A.

Also in the known system of FIG. 11, the instructor's radio control transmitter 1A switches between the passive mode and the active mode by operation of the trainer switch. The instructor's radio control transmitter 1A functioning in the passive mode emits a maneuvering signal carrying the maneuvering data contained in the input trainer signal via the antenna 7 and transmits it to the radio-controlled object 10.

In the active mode, the instructor's radio control transmitter 1A mode transmits a maneuvering signal carrying a maneuvering data obtained corresponding to a maneuvering operation of the instructor's radio control transmitter 1A, in place of the maneuvering data carried by the trainer signal.

FIG. 12 illustrates an exemplary case where the maneuvering signal or the trainer signal is a PPM (Pulse Position Modulation) signal.

In the maneuvering signal or trainer signal, channels may be assigned on a per-control-target (function) basis, the control targets including aileron and elevator. This may be called a "channel order." The maneuvering signal or the trainer signal illustrated in FIG. 12 includes a maximum of four (4) channels CH1 to CH4.

In the maneuvering signal or trainer signal in the form of the PPM signal, a reset pulse Prs rises at the beginning of one cycle. A channel pulse Pch1 corresponding to the channel CH1 rises after a lapse of a predetermined period of time following the rising edge of the reset pulse Prs, i.e., after a lapse of a reset period Trs. In other words, when the first pulse (i.e., the reset pulse Prs) rose, the reset period Trs elapsed, and the next pulse rose following the first pulse, then the next pulse is identified as the channel pulse Pch1.

Following the rising edge of the channel pulse Pch1, a channel pulse Pch2 corresponding to the next channel CH2 rises in response to lapse of a predetermined time T1, Thereafter in a similar manner, a channel pulse Pch3 corresponding to the channel CH3 and a channel pulse Pch4 corresponding to the channel CH4 rise after a lapse of predetermined times T2 and T3, respectively. Further, a next cycle's reset pulse Prs will rise after a lapse of a predetermined time T4 following a rising edge of the channel pulse Pch4.

The one cycle for the PPM signal as the maneuvering signal or the trainer signal is about 20 msec, depending upon the number of channels.

The times T1 to T4 in the above PPM signal are also referred to as pulse intervals. The pulse intervals T1 to T4 are each defined for corresponding each of the channel pulses Pch1 to Pch4. The pulse intervals T1 to T4 each indicate an amount of control for corresponding each of the functions assigned to the channels CH1 to CH4, respectively. A time length of the pulse intervals T1 to T4 between adjacent two of the series of channel pulses in the PPM signal represents the maneuvering data for the corresponding channel.

A known radio control transmitter of this kind is, for example, disclosed in Japanese Patent Application Laid-Open Publication No. H07-31751.

Referring again to FIG. 10, the instructor's radio control transmitter 1A and the trainee's radio control transmitter 1B are physically connected to each other via the trainer cable 11. For this reason, both of the operator acting as the instructor and the operator acting as the trainee have constraints regarding mutual positional relationship and postures, which make it difficult to maneuver the radio-controlled object.

In contrast, the configuration shown in FIG. 11 is not affected by the above constraints, for the trainer signal is transmitted and received via radio waves. However, the trainer signal receiver 12 in the configuration shown in FIG. 11 is a separate device operating independently from the radio control transmitter 1A. Furthermore, since the radio control transmitters can take various dimensions, the trainer signal receiver 12 in actual situation is often connected to the instructor's radio control transmitter 1A while hanging therefrom. Such a state may, in addition to the poor unsophisticated appearance, cause difficulty in maneuvering operation.

Also, in both of the configurations of FIGS. 10 and 11, it is cumbersome to provide components and/or devices other than the radio control transmitters as such, i.e., the trainer cable 11 in the case of FIG. 10 or the trainer signal receiver 12 in the case of FIG. 11.

SUMMARY OF THE INVENTION

In view of the above-identified drawbacks, an object of the present invention is to provide a radio control transmitter that allows the trainer features to be used without need of a separate trainer cable and a trainer signal receiver.

The radio control transmitter of the present invention has the following configuration. Specifically, the radio control transmitter comprises: a transmission unit that transmits a signal via radio waves; a reception unit that receives the signal via the radio waves; and a transmission and reception control unit.

The transmission and reception control unit can set a transmission mode period and a reception mode period for each frame period in which the frequency is switched by frequency hopping. In the transmission mode period and the reception mode period for each frame period, The transmission and reception control unit controls the transmission unit and makes it transmit a first signal to a radio control transmitter of a communication partner during the transmission mode period, and controls the reception mode period and makes it receive a second signal transmitted from the radio control transmitter of the communication partner.

The radio control transmitter with the above configuration of the present invention is capable of transmitting and receiving the trainer signal via radio communications with the partner's radio control transmitter. Thus, the radio control transmitter of the present invention does not need to include a separate trainer cable or a trainer signal receiver, thus facilitating maneuvering operation and improving device's appearance.

BRIEF DESCRIPTION OF THE DRAWINGS

The present invention is described in a preferred embodiment in the following description with reference to the drawings, in which like numbers represent the same or similar elements, as follows.

DESCRIPTION OF EXEMPLARY EMBODIMENT

Figure 1:
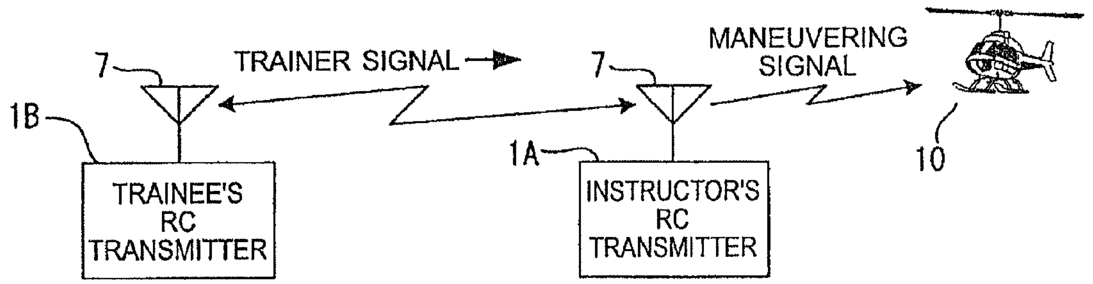
FIG. 1 is a schematic representation of device configuration of radio control transmitters supporting trainer features according to one embodiment of the present invention.

Although the following description contains specific implementation details for the purposes of illustration, those skilled in the art will appreciate that various variations and alterations to the following details fall within the scope of the present invention. Accordingly, the following exemplary embodiment of the invention is set forth without imposing limitations upon the claimed invention.

The exemplary embodiment of the present invention is to be presented according to the following organization.

1. Overview of Trainer Features
2. Exemplary External Appearance of Radio Control Transmitter
3. Exemplary System Configuration of Radio Control Transmitter
4. Exemplary System Configuration of Receiver
5. Communication System of Radio Control Transmitter
6. Trainer Features of This Embodiment 6-1. Link Setting 6-2. Operation in Trainer Mode 1. Overview of Trainer Features Referring to FIG. 1, there is shown an exemplary device configuration supporting trainer features of this embodiment, which includes, as a radio control transmitter 1 of this embodiment, an instructor's radio control transmitter 1A and a trainee's radio control transmitter 1B; and an object 10 to be controlled (hereafter referred to as "radio-controlled object 10"). The radio-controlled object 10 may be an air vehicle such as a radio-controlled helicopter and a radio-controlled airplane. The trainer features of this embodiment are also applicable in a case where the radio-controlled object 10 is not an air vehicle. However, as can be appreciated from the foregoing description, significance of the trainer features will be larger when the radio-controlled object 10 is the air vehicle.

In this embodiment, a trainer signal may be carried by a radiowave and transmitted via an antenna 7 through radio communications. The trainee's radio control transmitter 1B that entered in a trainer mode transmits the trainer signal via the radio communications. The trainer signal, as has been explained in the foregoing, is a signal for use in transmission of maneuvering data to the instructor's radio control transmitter 1A, the maneuvering data indicative of information corresponding to maneuvering operation attempted in the trainee's radio control transmitter 1B.

The instructor's radio control transmitter 1A receives, via an antenna 7, the radiowave carrying the trainer signal. When functioning in the trainer mode, the instructor's radio control transmitter 1A can switch between a passive mode and an active mode in accordance with operation of a trainer switch.

When functioning in the passive mode in the trainer mode, the instructor's radio control transmitter 1A generates the maneuvering signal that carries the maneuvering data contained in the incoming trainer signal, and the maneuvering signal is then transmitted to the radio-controlled object 10.

When functioning in the active mode in the trainer mode, the instructor's radio control transmitter 1A does not transmit the above maneuvering signal generated on the basis of the trainer signal. Instead, a maneuvering signal storing maneuvering data corresponding to a maneuvering operation attempted in the instructor's radio control transmitter 1A itself is transmitted to the radio-controlled object 10. This maneuvering signal is transmitted to the radio-controlled object 10 via the antenna 7 and through the radio communications using the radiowaves, in a similar manner as in the case of the trainer signal reception.

The radio-controlled object 10 may include a receiver and servo components. When the receiver receives the maneuvering signal, the maneuvering signal is demodulated to obtain the maneuvering data, i.e., amounts of control on a per-channel basis. Further, the servo components associated with the corresponding channels operate in accordance with the obtained per-channel-basis amounts of control.

Thus, in a normal mode or in the active mode in the trainer mode, the radio-controlled object 10 is operated in accordance with the maneuvering operation directed to the instructor's radio control transmitter 1A. Meanwhile, in the passive mode in the trainer mode, the radio-controlled object 10 is operated in accordance with the maneuvering operation directed to the trainee's radio control transmitter 1B.

As has been described in the foregoing, the trainer features according to the one embodiment of the present invention allow the trainer signal to be transmitted and received between the trainee's radio control transmitter 1B and the instructor's radio control transmitter 1A via the radio communications using the radiowaves. It is also appreciated that a radio control transmitter incorporating the trainer features of this embodiment does not need to include a separate trainer cable or a trainer signal receiver.

Thus, the aforementioned difficulty in the maneuvering operation and poor and/or unsophisticated device appearance can be eliminated. Also, there will not be cumbersomeness of providing separate components and devices other than the radio control transmitter as such.

2. Exemplary External Appearance of Radio Control Transmitter

The following describes the technical configuration for implementing the trainer features shown in FIG. 1 that does not involve the trainer cable or the trainer signal receiver.

Figure 2:
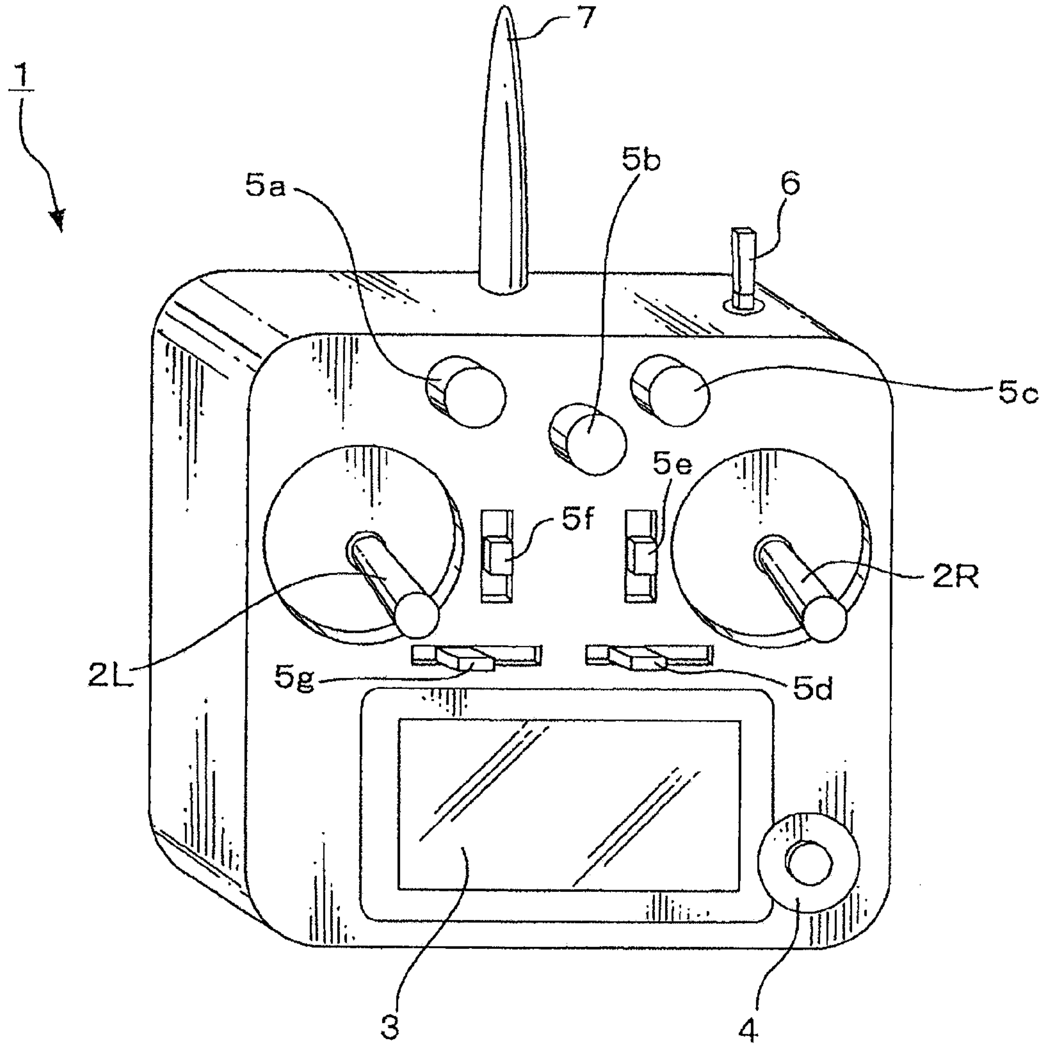
FIG. 2 is a perspective view of an external appearance of the radio control transmitter according to one embodiment of the present invention.

Referring to FIG. 2, there is shown an exemplary external appearance of the radio control transmitter 1 (or RC transmitter). The radio control transmitter 1 of FIG. 1 can serve as the instructor's radio control transmitter 1A and the trainee's radio control transmitter 1B. The radio control transmitter 1 is a so-called stick-type device.

A front panel of the radio control transmitter 1 includes a left stick lever 2L in a left portion thereof and a right stick lever 2R in a right portion thereof. When an operator operates the left stick lever 2L and the right stick lever 2R in upper, lower, left, and right directions, the maneuvering signal indicative of information on the amount of control in accordance with the operation is transmitted from the radio control transmitter 1 to the radio-controlled object. Thus, maneuvering operations such as ascent, descent, turn, and speed of the radio-controlled object can be controlled.

For example, the operation of the left stick lever 2L and the right stick lever 2R in the upper, lower, right and left directions are associated with a specific channel.

The front panel of the radio control transmitter 1 also includes a display screen 3 below the left stick lever 2L and the right stick lever 2R. The display screen 3 may be a portion of the display device where an image is indicated as required. For example, various settings and control status information during maneuvering operation (or flight operation) may be indicated.

An operation element 4 is provided to the right of the display screen 3 for making operations related to the image displayed on the display screen 3. Also, a configuration that incorporates a touch panel along with the display screen 3 may be used to control the image indicated on the display screen 3.

The radio control transmitter 1 also includes other operation elements such as dial operation elements 5*a* to 5*c* and push switches 5*d* to 5*g*. These operation elements may be associated with desired parameters and/or channels according to user's needs and preferences.

The antenna 7 is adapted to emit a radiowave carrying the maneuvering signal and thus transmit the maneuvering signal to the radio-controlled object 10. Also, when the instructor's radio control transmitter and the trainee's radio control transmitter transmit and receive signals via radio transmission paths, the radiowaves are transmitted and received via the antenna 7 between the instructor's radio control transmitter 1A and the trainee's radio control transmitter 1B.

3. Exemplary System Configuration of Radio Control Transmitter

Figure 3:
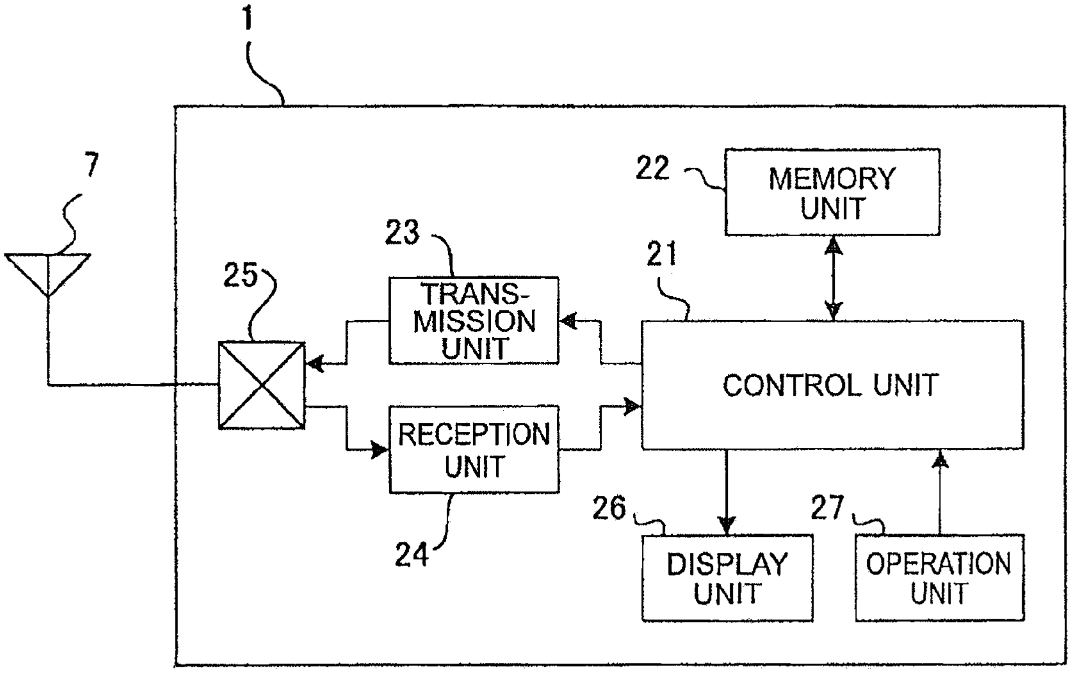
FIG. 3 is a block diagram of exemplary system configuration of an instructor's radio control transmitter and the trainee's radio control transmitter according to one embodiment of the present invention.

Referring to FIG. 3, there is shown an exemplary system configuration of the radio control transmitter 1 according to this embodiment. The illustrated radio control transmitter 1 includes a control unit 21, a memory unit 22, a transmission unit 23, a reception unit 24, a synthesizer-distributor unit 25, a display unit 26, and an operation unit 27.

The control unit 21 may comprise a central processing unit (CPU) and a random access memory (RAM) unit, and is configured to perform various maneuvering operations in the radio control transmitter 1 in accordance with the program stored in the memory unit 2.

The memory unit 22 in the context of this embodiment may be an auxiliary storage device for the control unit 21, in which various settings information is stored in addition to the above-mentioned program, The transmission unit 23 is adapted to be controlled by the control unit 21, modulate data signal for transmission in accordance with a later-described communication system, and output the modulated data signal as a transmission signal to the synthesizer-distributor 25. This transmission signal may be the maneuvering signal to be transmitted to the radio-controlled object 10 in the context of the instructor's radio control transmitter 1A, and the trainer signal in the context of the trainee's radio control transmitter 1B.

The synthesizer-distributor 25 is adapted to output the transmission signal, which has been input from the transmission unit 23, to the antenna 7. Thus, by virtue of the antenna 7, the transmission signal in conformance to the predetermined communication system is emitted through the radiowave.

Also, a signal received through the radiowave by the antenna 7 is input to the synthesizer-distributor 25. The synthesizer-distributor 25 outputs the signal input via the antenna 7 to the reception unit 24.

The reception unit 24 is adapted to demodulate the received signal input thereto to extract a received data and transfer the data to the control unit 21. The transferred received data is processed by the control unit 21.

For example, in the context of the instructor's radio control transmitter 1A, the trainer signal received by the antenna 7 is demodulated by the reception unit 24, and the maneuvering data on a per-channel basis contained in the trainer signal is extracted. Further, in the passive mode in the trainer mode, the control unit 21 generates the maneuvering signal from the extracted per-channel-basis maneuvering data, and the maneuvering signal is transferred to the transmission unit 23 and emitted via the antenna 7 through the radiowave.

The display unit 26 comprises a display device and is configured to be operated and controlled by the display control by the control unit 21 and indicate the image. The portion of the display unit 26 where the image is indicated corresponds to the display screen 3 shown in FIG. 2.

The operation unit 27 generically represents various operation elements incorporated in the radio control transmitter 1 shown in FIG. 2. When the operation unit is operated belonging to the operation unit 27, the maneuvering signal corresponding to the operation is input to the control unit 21. The maneuvering signal is processed by the control unit 21 as required.

If the maneuvering signal to be input is indicative of the maneuvering operation of the corresponding operation element associated with a function assigned to a channel, then the control unit 21 calculates an amount of control for the corresponding function on the basis of the maneuvering signal. Then, in the context of the instructor's radio control transmitter 1A, in the normal mode with the trainer mode disabled or in the active mode in the trainer mode, the maneuvering data including information on this amount of control is associated with the corresponding channel in the maneuvering signal and included in the same maneuvering signal, and emitted via the antenna 7.

In the context of the trainee's radio control transmitter 1B, in the trainer mode, the trainee's radio control transmitter 1B generates the trainer signal in which the maneuvering data indicative of information on the amount of control is associated with the corresponding channels, and the thus generated trainer signal is emitted via the antenna 7.

4. Exemplary System Configuration of Receiver

Figure 4:
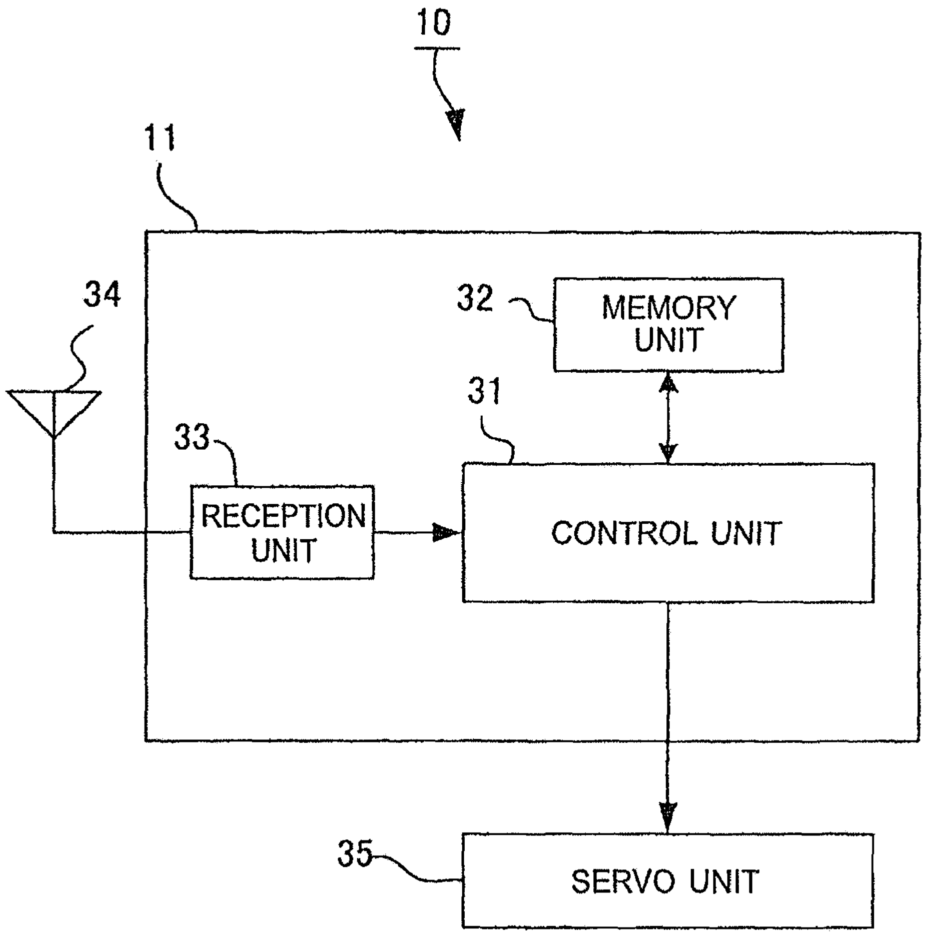
FIG. 4 is a block diagram of an exemplary system configuration of a receiver incorporated in a radio-controlled object.

Referring to FIG. 4, there is shown an exemplary system configuration of a receiver 11 of the radio-controlled object 10. The receiver 11 includes a control unit 31, a memory unit 32, a reception unit 33, and an antenna 34.

A servo unit 35 is also illustrated in FIG. 4. If the radio-controlled object 10 is an air vehicle, then the radio-controlled object 10 includes various servo motors for driving an aileron and a flap. The servo unit 35 generically represents these servo motors and other functional units to be controlled.

The control unit 31 may comprise a central processing unit (CPU) and other functional units and be adapted to execute programs stored in the memory unit 32 to handle transmitter's various operations.

The memory unit 32 in this context may serve as the unit corresponding to the auxiliary storage device for the control unit 31, and stores the above-described program and various settings information.

The maneuvering signal carried by the radiowave transmitted from the radio control transmitter is received by the antenna 34. The reception unit 33 demodulates the received maneuvering signal to extract the maneuvering data on the per-channel basis. The control unit 31, on the basis of the maneuvering data on a per-channel basis, controls the operation of the functional units such as the servo components associated with the maneuvering data on the per-channel basis. Thus, the radio-controlled object 10 operates in accordance with the maneuvering operation directed to the radio control transmitter 1.

5. Communication System of Radio Control Transmitter

The radio control transmitter 1 of this embodiment adopts frequency hopping spread spectrum techniques in 2.4 GHz band for the radio communications via the antenna 7. The frequency hopping techniques has a rule called "frequency hopping pattern" defined between a transmitter and a receiver, according to which the communications frequencies are switched with high-speed communications within a communication band.

Figure 5:
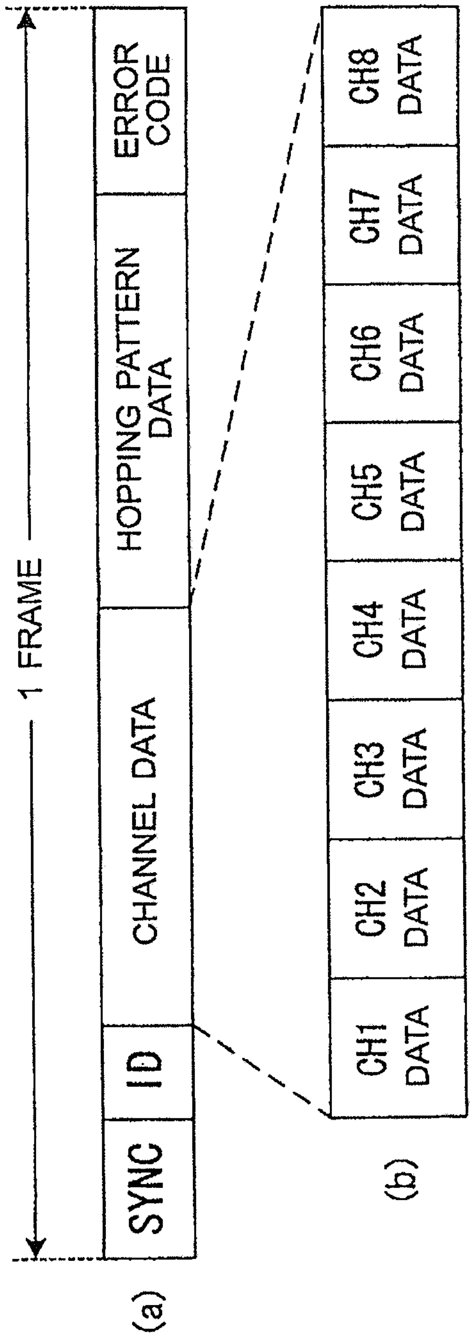
FIG. 5 illustrates an exemplary 2.4 GHz band data structure of a maneuvering signal and a trainer signal according to one embodiment of the present invention.

Referring to FIG. 5, there is shown an exemplary data structure of the maneuvering signal transmitted by the radio control transmitter 1 of this embodiment functioning with the 2.4 GHz frequency hopping. It should be noted that the trainer signal of this embodiment also has the data structure of FIG. 5.

The portion (a) of FIG. 5, is an entire structure of the one frame in the maneuvering signal. In this embodiment, every time the frequency is switched in accordance with the principles of the frequency hopping. The data for the one frame of the portion (a) of FIG. 5 is transmitted as the maneuvering signal.

The data of the maneuvering signal of the portion (a) of FIG. 5 includes: a SYNC code (synchronization code) at the beginning thereof; a transmitter ID; a channel data, a hopping pattern data; and an error code, in this order.

The SYNC code is a synchronization code for the transmission data in units of frames, and comprises a predetermined bit pattern constituted by a predetermined number of bits.

The transmitter ID stores an identifier (ID) assigned to the radio control transmitter 1 that transmits this transmission data, the ID comprising a predetermined number of bits.

The channel data stores data (i.e., the maneuvering data) on the amounts of control for the corresponding channels on the per-channel basis. For example, if a maximum number of the channels that the radio control transmitter 1 can support eight (8), then the channel data is constructed, in a manner as shown in the portion (b) of FIG. 5, by arranging the individual channel data for the corresponding channels CH1 to CH8 in this order. These individual channel data each have the same fixed-length bits. The amount of control is represented by the values of these bits.

The hopping pattern data may store information on (i) the specified frequency hopping pattern and (ii) data indicative of the frequency at which the current frame is transmitted according to the specified frequency hopping pattern.

The error code may be added for error detection and error correction of the channel data and the hopping pattern data.

Figure 6:
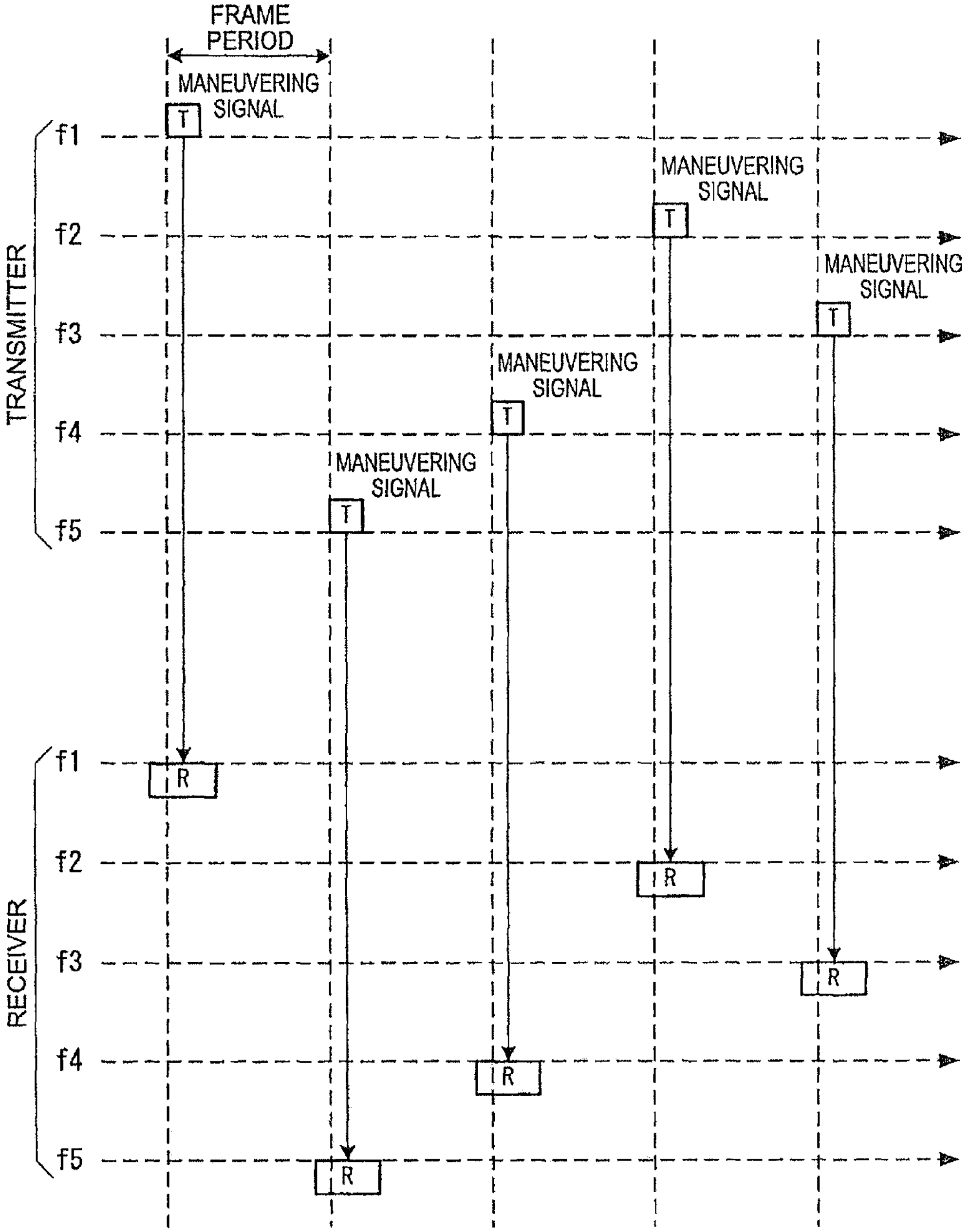
FIG. 6 illustrates maneuvering signal transmission and reception operation in a normal mode between the radio control transmitter and the receiver according to one embodiment of the present invention.

Referring to FIG. 6, there is shown basic modes of transmission and reception of the maneuvering signal between the radio control transmitter 1 and the receiver 11 of the radio-controlled object 10 according to this embodiment. With regard to the frequency hopping pattern, the number of hopping channels that can be switched is equal to or more than ten (10) channels. For simplified illustration, only five (5) hopping channels are illustrated in FIG. 6.

Also, FIG. 6 illustrates communications operation in which synchronization of the frequency hopping pattern is already established between the radio control transmitter 1 and the receiver 11 of the radio-controlled object 10.

FIG. 6 illustrates five frequencies f1 to f5 corresponding to the five hopping channels. The frequencies f1 to f5 are switched upon the lapse of a predetermined period indicated as a "frame period" in the figure.

In the first frame period shown in this figure, the radio control transmitter 1A transmits the maneuvering signal in a predetermined transmission period at the frequency f1. At this point, the receiver 11 of the radio-controlled object 10 selects the frequency f1 and specifies a reception waiting period corresponding to the above-described transmission period. Thus, the maneuvering signal is transmitted and received in the hopping channel at the frequency f1. In this frame period, the maneuvering signal that is transmitted and received constitutes the data for the one frame shown in FIG. 5.

In the next frame period, the radio control transmitter 1A and the receiver 11 switch to the frequency f5 for transmission and reception of the maneuvering signal. Thereafter, the radio control transmitter 1A transmits the maneuvering signal for each of the frame periods at the frequencies f4, f2, and f3, respectively. Although not shown, in the frame period following the frame period at the frequency 13, the maneuvering signal is transmitted and received in the same order starting from the frequency f1 as described above.

This means that, in FIG. 6, with regard to the frequency hopping pattern, the maneuvering signal is transmitted and received repeatedly in the order of frequencies f1, f5, f4, f2, and f3 for each of the frame periods.

The communications using frequency hopping scheme of this kind is in general interference-tolerant. For example, suppose that pairs of the radio control transmitter 1 and the receiver 11 having the same communication spec with the same 2.4 GHz band are disposed in substantially the same place. In this case, when different frequency hopping patterns are set for each of the pairs to transmit and receive the maneuvering signal, then there will be substantially no case where the same hopping channel frequency is occupied by the multiple pairs. Although the same hopping channel frequency could be used between certain pairs, but the frequency is always switched with high speed, and accordingly such situation is transient and there will be no disturbance or interference that degrades effective communications.

In order to determine the hipping pattern used by one pair of the radio control transmitter 1 and the receiver 11, the radio control transmitter 1 judges, prior to starting the communications with the receiver 11, whether or not the same 2.4 GHz band radiowave is already used by other pair of communications devices.

In order to make the above judgment, the radio control transmitter 1 makes the reception unit 24 input the signal obtained by receiving the radiowave by the antenna 7. The reception unit 24 has the demodulation feature corresponding to the 2.4 GHz band communications, and accordingly can judge whether or not the received radiowave is in the 2.4 GHz band. Further, if it is judged that the received radiowave is in the 2.4 GHz band, its frequency hopping pattern is identified.

Further, when the radio control transmitter 1 communicates with the receiver 11, an unused frequency hopping pattern is determined that is different from the above identified frequency hopping pattern.

Further, the maneuvering signal is transmitted with synchronization established with the receiver 11 in accordance with the determined frequency hopping pattern.

For example, as the radio control transmitter 1, when using frequency dedicated to Japan's domestic radio control devices such as 40 MHz band and 72 MHz band, such devices often only include radiowave transmission features and does not include the reception features.

However, according to the above procedure for determining the frequency hopping pattern, the radio control transmitter 1 of this embodiment corresponding to the 2.4 GHz band, its main features is to transmit through the radiowave the maneuvering signal, and at least includes signal reception features with the same 2.4 GHz band radiowave. This can be appreciated from the illustration of FIG. 3 in which the reception unit 24 is included.

With regard to the trainer features of this embodiment, the radio control transmitter 1 supporting the 2.4 GHz band communications has the reception features by default. Specifically, the trainee's radio control transmitter 1B is capable of transmitting the trainer signal in the 2.4 GHz band. Also, the instructor's radio control transmitter 1A, using the above-described reception features, can receive the trainer signal in the 2.4 GHz band. Thus, the trainer signal can be directly transmitted and received via the radio communications between the radio control transmitters without using the trainer cable or the trainer signal receiver.

The instructor's radio control transmitter 1A receives the trainer signal and transmits the maneuvering signal in the same 2.4 GHz band. However, the instructor's radio control transmitter 1A searches for the unused frequency hopping pattern so that the transmission and reception of the trainer signal with the trainee's radio control transmitter 1B and the transmission and reception of the maneuvering signal with the receiver 11 employ frequency hopping patterns different from each other. Thus, the probability of interference between the trainer signal and the maneuvering signal is decreased.

6. Trainer Features of This Embodiment 6-1. Link Setting

The following describes the communications operation for exploiting the trainer features of this embodiment.

As has been illustrated in FIG. 1, as the device configuration corresponding to the trainer features of this embodiment, two radio control transmitters 1 which is the instructor's radio control transmitter 1A and the trainee's radio control transmitter 1B, and one radio-controlled object 10 are involved.

As a prerequisite for the radio communications using the trainer features with this configuration, it has to be ensured that the radio-controlled object 10 do not respond to signals from other radio control transmitters, but only receive signals from the instructor's radio control transmitter 1A so as to establish the pairing, and that the instructor's radio control transmitter 1A do not respond to trainer signals originating from other radio control transmitters 1, but only receive the trainer signal from the trainee's radio control transmitter 1B so as to establish the pairing.

Also, it has to be ensured in the trainer features of this embodiment that the maneuvering signal that the instructor's radio control transmitter 1A transmits to the radio-controlled object 10 be also received by the trainee's radio control transmitter 1B, and this be used for switching time synchronization for switching the frequencies. In view of this, it has to be ensured that the trainee's radio control transmitter 1B do not respond to the maneuvering signal originating from any other radio control transmitter 1, but only receive the maneuvering signal originating from the instructor's radio control transmitter 1A so as to establish the pairing. Here, the settings for establishing the pairing are referred to as "link setting."

Figure 7:
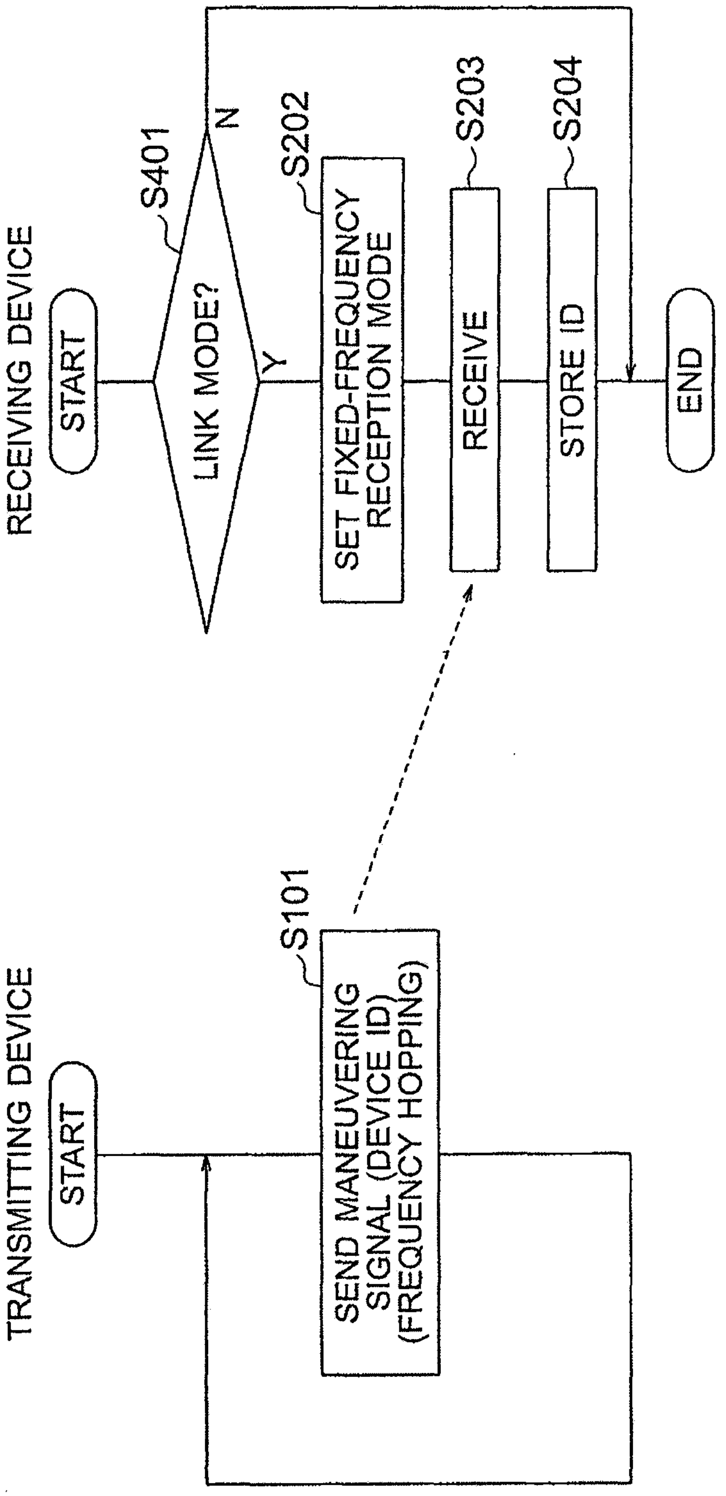
FIG. 7 is a flowchart describing the procedure for establishing a link between the instructor's radio control transmitter and receiver and the trainee's radio control transmitter according to one embodiment of the present invention.

When using the trainer features, an operator who is acting either as an instructor or as a trainee handles the above link setting. In the flowchart of FIG. 7, the procedure for the link setting is described along with the operation that should be performed by the counterpart device to be linked by the link setting.

FIG. 7 illustrates the processing by the device acting as the transmitter and the processing by the device acting as the receiver. The device acting as the transmitter and the device acting as the receiver may vary depending on the combination of the devices to be placed in the link mode which will be described in the following paragraphs.

First, the link settings are described between the instructor's radio control transmitter 1A and the receiver 11 of the radio-controlled object 10. In this case, the instructor's radio control transmitter 1A transmits the maneuvering signal, and the receiver 11 receives it, which means that the instructor's radio control transmitter 1A functions as the "device acting as the transmitter" and the receiver 11 as the "device acting as the receiver."

In this case, first, the instructor's radio control transmitter 1A is placed in the normal mode in which the normal operations are available. The instructor's radio control transmitter 1A continues transmitting the maneuvering signal with the frequency hopping pattern that has already been determined corresponding to the communication with the receiver 11 (the step S101 of FIG. 7).

In this state, the operator performs the operation for setting the link mode with respect to the receiver 11. The receiver 11 in the normal mode judges whether or not the link mode has been set (the step S201 of FIG. 7). Further, an affirmative judgment (Y) results in the step S201, then the process goes to the link mode operation of the step S202 and the steps that follow.

In the step S202, a state is set in which the frequency is fixed to the one that has been selected from among the hopping channels. Specifically, the reception unit 34 is placed in a mode in which the reception unit 34 only processes the signal received at the frequency of the above one hopping channel.

At this point, the receiver 11 is in a state of reception waiting at the one hopping channel frequency, and the instructor's radio control transmitter 1A transmits the maneuvering signal while switching the frequencies. Accordingly, when the hopping channel frequency of the instructor's radio control transmitter 1A becomes the same as the hopping channel frequency fixed on the side of the receiver 11, then the receiver 11 receives the maneuvering signal (the step S203).

Meanwhile, in the receiver 11 that has received the maneuvering signal, the reception unit 33 demodulates the received maneuvering signal to extract the data carried by the maneuvering signal and transfer it to the control unit 31.

The data of the maneuvering signal, as shown in the portion (a) of FIG. 5, includes the transmitter ID. In this case, the transmitter ID of the instructor's radio control transmitter 1A is included. In the step S204, the control unit 31 of the receiver 11 stores this transmitter ID in the memory unit 32 (which may be a RAM unit). The link mode will be exited upon completion of storing the transmitter ID in the step S204.

In accordance with the above link setting procedure, the receiver 11 now obtains the transmitter ID of the instructor's radio control transmitter 1A and, thereafter, the receiver 11 handles processing assuming that the maneuvering signal containing the transmitter ID of the instructor's radio control transmitter 1A is only valid out of the received maneuvering signals. In this manner, the link setting has been completed for making the receiver 11 only operate in response to the maneuvering signal originating from the instructor's radio control transmitter 1A.

Next, the following describes the link setting for making the instructor's radio control transmitter 1A only receive the maneuvering signal originating from the trainee's radio control transmitter 1B. In this context, the trainee's radio control transmitter 1B acts as the "device acting as the transmitter" and the instructor's radio control transmitter 1A as the device acting as the receiver" in FIG. 7.

The trainee's radio control transmitter 1B is placed in the normal mode, and continues transmitting the maneuvering signal using the frequency hopping scheme (the step S101). Meanwhile, the instructor's radio control transmitter 1A handles the link mode settings process (the steps S202 to S204). Thus, the transmitter ID of the trainee's radio control transmitter 1B is stored in the memory unit 22 of the instructor's radio control transmitter 1A (the step S204).

The trainer signal of this embodiment also has the data structure shown in FIG. 5. Accordingly, the trainer signal contains the transmitter ID of the trainee's radio control transmitter 1B. Accordingly, in the following paragraphs, the instructor's radio control transmitter 1A is allowed to operate and only accept the trainer signal originating from the trainee's radio control transmitter 1B having the transmitter ID stored in the memory unit 22.

Further, in the link setting for making trainee's radio control transmitter 1B only receive the maneuvering signal originating from the instructor's radio control transmitter 1A, the instructor's radio control transmitter 1A serves as the device acting as the transmitter, and the trainee's radio control transmitter 1B as the device acting as the receiver of FIG. 7.

In this case too, in a similar manner as in the above-described procedure, the trainee's radio control transmitter 1B is placed in the normal mode, and the instructor's radio control transmitter 1A handles the link mode setting, and thus memory unit 22 of the trainee's radio control transmitter 1B stores the transmitter ID of the instructor's radio control transmitter 1A.

By these three link settings, (a) the pairing regarding the transmission and reception of the maneuvering signal from the instructor's radio control transmitter 1A to the receiver 11, (b) the pairing regarding the transmission and reception of the trainer signal from the trainee's radio control transmitter 1B to the instructor's radio control transmitter 1A, and (c) the pairing regarding the transmission and reception of the maneuvering signal from the instructor's radio control transmitter 1A to the trainee's radio control transmitter 1B have been established.

6-2. Operation in Trainer Mode

After completion of the above link settings, the operators, i.e., the instructor and the trainee handle maneuvering operation directed to the radio-controlled object 10 in a state where the trainer mode has been successfully established between the instructor's radio control transmitter 1A and the trainee's radio control transmitter 1B.

Figure 8:
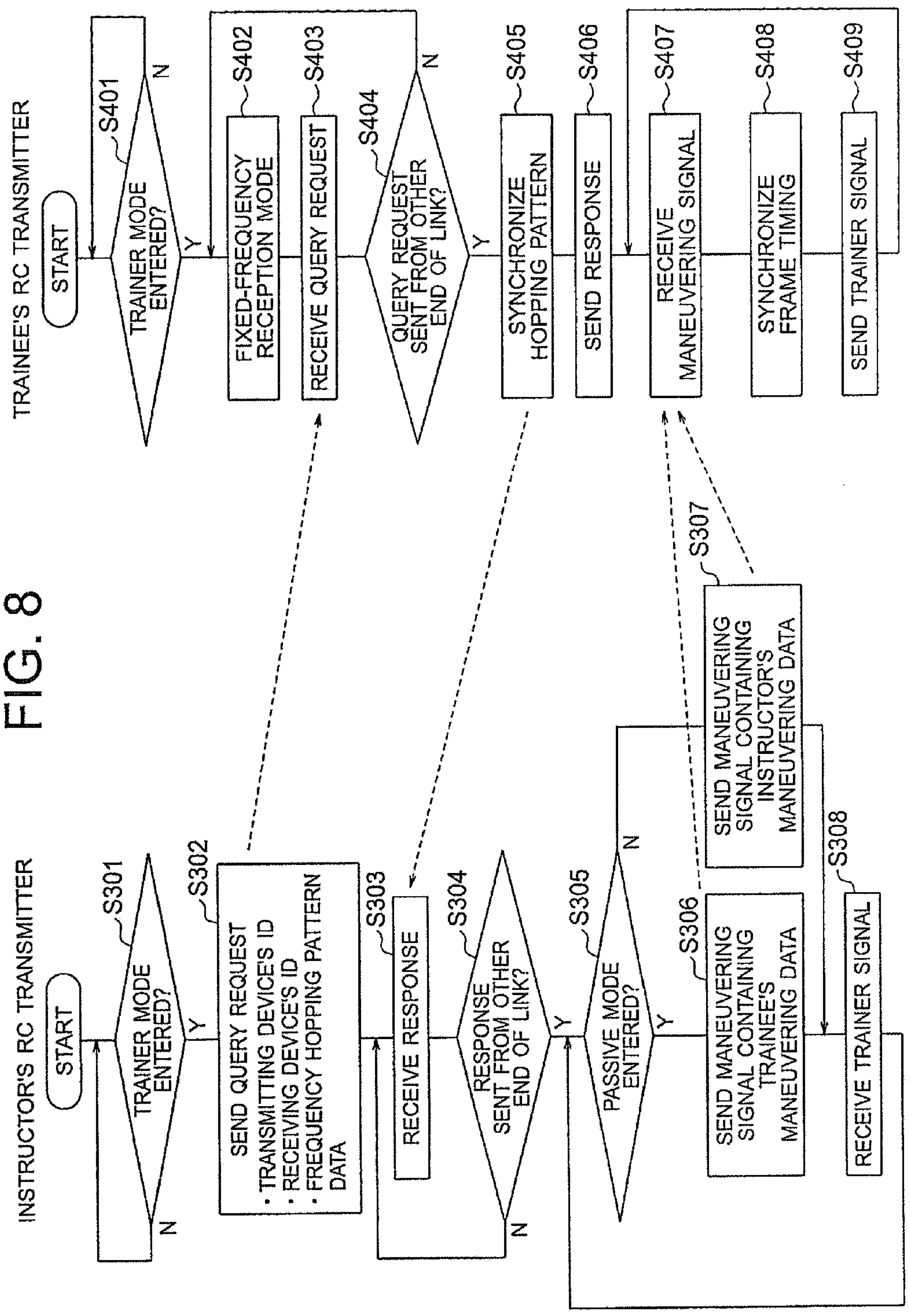
FIG. 8 is a flowchart describing the procedure in a trainer mode of the instructor's radio control transmitter and the trainee's radio control transmitter according to one embodiment of the present invention.

FIG. 8 is a flowchart illustrating the procedures of the instructor's radio control transmitter 1A and the trainee's radio control transmitter 1B in the trainer mode. The procedures shown in FIG. 8 may be executed by the program stored in the memory unit 22, the program being executed by the control units 21 (CPU) of the instructor's radio control transmitter 1A and the trainee's radio control transmitter 1B.

In order to enable the trainer mode, necessary operation is to be performed for the instructor's radio control transmitter 1A and the trainee's radio control transmitter 1B. Alternatively, the trainer mode may automatically be enabled upon completion of the pairing between the instructor's radio control transmitter 1A and the trainee's radio control transmitter 1B for transmission and reception of the trainer signal and the maneuvering signal.

First, the instructor's radio control transmitter 1A waits for successful completion of the trainer mode settings (the step S301 of FIG. 8). When the trainer mode has been successfully established, then the process goes to the step S302.

In the step S302, the instructor's radio control transmitter 1A transmits a query request to the trainee's radio control transmitter 1B for establishing the synchronization of the hopping pattern for transmission and reception of the maneuvering signal with respect to the trainee's radio control transmitter 1B.

With regard to the transmission of the above query request, the frame data containing the same query request are repeatedly transmitted for each of the hopping channel frequencies according to the frequency hopping scheme.

The query request contains at least the transmitter ID (i.e., a transmitting device ID) of the instructor's radio control transmitter 1A itself, the transmitter ID of the trainee's radio control transmitter 1B (i.e., a receiving device ID), and the frequency hopping pattern data indicative of the current frequency hopping pattern and the hopping channel frequency.

The trainee's radio control transmitter 1B waits for the successful completion of the trainer mode settings (the step S401). In response to the operation for enabling the trainer mode, the process goes to the step S402.

In the step S402, the trainee's radio control transmitter 1B places the reception unit 24 in the fixed frequency reception mode. The fixed frequency reception mode is a communications mode in which the frequency hopping is not performed and the reception mode period continues with the hopping channel frequency fixed to one of the hopping channel frequencies. In this state, when the hopping channel frequency at which the instructor's radio control transmitter 1A transmits in the step S302 coincides with the above fixed hopping channel frequency, then the query request is received by the trainee's radio control transmitter 1B (the step S403).

The trainee's radio control transmitter 1B that has received the query request judges whether or not the received query request is transmitted to the transmitter 1B from the transmitter with which the link setting (pairing) has been established for the trainer signal transmission and reception.

In order to achieve this, the transmitting device ID and the receiving device ID are referenced in the received query request. The transmitting device ID is the transmitter ID of the radio control transmitter that has transmitted the query request. If, the transmitter ID stored in the memory unit 22 of the trainee's radio control transmitter 1B and the transmitting device ID in the query request are the same by virtue of the link setting for the transmission and reception of the maneuvering signal, then the query request received this time is identified as having been transmitted by the instructor's radio control transmitter 1A of the other end of the link. Here, further, if the receiving device ID in the query request and the transmitter ID of the trainee's radio control transmitter 1B are the same, then the query request received this time is identified as having been transmitted for the trainee's radio control transmitter 1B.

In the step S404, if a negative judgment N results, then the process goes back to the step S402 and the trainee's radio control transmitter 1B waits for the query request transmitted to it from the instructor's radio control transmitter 1A of the other end of the link. If the judgment in the step S404 is affirmative, the process goes to the step S405.

In the step S405, in response to the successful reception of the query request from the other end of the link, the sate of the fixed hopping channel frequency is exited and the operation switches to the transmission and reception by the frequency hopping. Further, at this point, synchronization is performed with respect to the instructor's radio control transmitter 1A's frequency hopping.

For this synchronization, the frequency hopping pattern data contained in the query request received this time is referenced. The frequency hopping pattern data indicates (i) the frequency hopping pattern set in the instructor's radio control transmitter 1A, and (ii) the hopping channel frequency at which the query request received this time has been transmitted.

The trainee's radio control transmitter 1B specifies the frequency hopping pattern to be the same one as that of the instructor's radio control transmitter 1A indicated by the frequency hopping pattern data. The frequency hopping is now started from the frame period of the hopping channel frequency following the hopping channel frequency at which the current query request has been transmitted. In this manner, the frequency hopping pattern synchronization is established between the instructor's radio control transmitter 1A and the trainee's radio control transmitter 1B.

The start timing of the frequency hopping at this point may be set as the timing after lapse of a predetermined time from the timing at which the query request was received corresponding to the frame period.

In the manner as described above, when the hopping pattern synchronization has been established, the trainee's radio control transmitter 1B in the step S406 transmits the response for the query request received this time to the instructor's radio control transmitter 1A.

In the step S303, the instructor's radio control transmitter 1A receives a response to the above query request. The response from the trainee's radio control transmitter 1B is transmitted at a frequency in accordance with the frequency hopping pattern. At this stage, by the preceding step S405, the synchronization of the frequency hopping pattern has been established, and accordingly the instructor's radio control transmitter 1A can also receive the response at the same frequency.

The instructor's radio control transmitter 1A that has received the response judges whether or not the source of the response is the other end of the established link and the destination of the response is the instructor's radio control transmitter 1A itself (the step S304).

The data structure of the response may include the transmitter ID indicative of the source of the response and the transmitter ID indicative of the destination of the response. The instructor's radio control transmitter 1A, on the basis of these transmitter IDs, makes judgment in a similar manner as in the step S404.

Specifically, the instructor's radio control transmitter 1A compares the transmitter ID indicative of the source of the response with the transmitter ID of the trainee's radio control transmitter 1B stored in the memory unit 22. If these two IDs are the same, it is determined that the response has been transmitted from the other end of the established link, i.e., the trainee's radio control transmitter 1B. Further, the instructor's radio control transmitter 1A judges that it is the response transmitted to itself if the transmitter ID indicative of the source of transmission in the response is the same as its own transmitter ID.

When a negative judgment N results in the step S304, the process goes back to the step S303 and the instructor's radio control transmitter 1A waits for reception of the response. When an affirmative judgment Y results, the process goes to the step S305.

The steps S305 to S308 handles transmission of the maneuvering signal and reception of the trainer signal for one frame period.

In the step S305, the instructor's radio control transmitter 1A judges whether or not the passive mode is currently enabled. If an affirmative judgment Y results, the process goes to the step S306, where the transmission mode is enabled and the maneuvering signal is transmitted that contains channel data containing the trainee's maneuvering data. The trainee's maneuvering data is the maneuvering data (data on the amount of control) assigned on a per-channel and contained in the channel data of the trainer signal which is received in the step S308. Thus, in the passive mode, the radio-controlled object 10 operates in response to the maneuvering operation directed to the trainee's radio control transmitter 1B.

In contrast, when a negative judgment N results in the step S305 and the active mode is enabled, then the process goes to the step S307 where the transmission mode is set and the maneuvering signal containing the instructor's maneuvering data is transmitted. The instructor's maneuvering data is the maneuvering data obtained on a per-channel basis in response to the maneuvering operation status for the operation element associated with the individual channel in the instructor's radio control transmitter 1A (which includes a neutral state where no operation is attempted). Accordingly, In this case, the active mode is entered in which the radio-controlled object 10 operates in accordance with the maneuvering operation directed to the instructor's radio control transmitter 1A.

The instructor's radio control transmitter 1A, at a timing after the transmission of the maneuvering signal in the step S306 or in the step S307, in the same frame period, the instructor's radio control transmitter 1A sets the reception mode period (the step S308). At this timing at which the reception mode period is enabled, the trainee's radio control transmitter 1B transmits the trainer signal in the later-described step S409. The trainer signal is received in the reception mode period in the step S308. The trainer signal in this case has, as has been explained in the foregoing, the structure similar to that of FIG. 5.

Although not shown in FIG. 8, when the trainer signal is received in the step S308, the instructor's radio control transmitter 1A may judge whether or not the trainer signal has been transmitted from the other end of the established link, i.e., the trainee's radio control transmitter 1B, the judgment being made on the basis of the transmitter ID indicative of the source of the trainer signal and the transmitter ID indicative of the destination of the trainer signal and, the IDs being carried by the trainer signal. Further, when it is judged that the trainer signal has been transmitted to the instructor's radio control transmitter 1A from the other end of the link, i.e., the trainee's radio control transmitter 1B, the trainer signal is demodulated by the reception unit 24 and transferred to the control unit 21. If not, then the trainer signal will not be processed.

Further, after the trainer signal has been received and demodulated in step S308, the process goes back to the step S305 at the timing corresponding to the next frame starting time. Thus, the instructor's radio control transmitter 1A repeatedly transmits the maneuvering signal and receives and demodulates the trainer signal in each of the frame periods.

Also, the trainee's radio control transmitter 1B, after having transmitted the response in the steps S406 and S407 performs frequency hopping with the frequency hopping pattern in synchronization with that of the instructor's radio control transmitter 1A. The instructor's radio control transmitter 1A in the step S306 or S307 transmits the maneuvering signal for each frame period.

Since the frequency hopping patterns are synchronized between the trainee's radio control transmitter 1B and the instructor's radio control transmitter 1A, the trainee's radio control transmitter 1B can receive the maneuvering signal. The trainee's radio control transmitter 1B, in the step S407, will receive the maneuvering signal in the reception mode period set in the later-described frame period.

The reception of the maneuvering signal by the trainee's radio control transmitter 1B is made for the purpose of synchronizing the frame timing (i.e., a timing at which the frame period is switched) in the next step S408.

Figure 9:
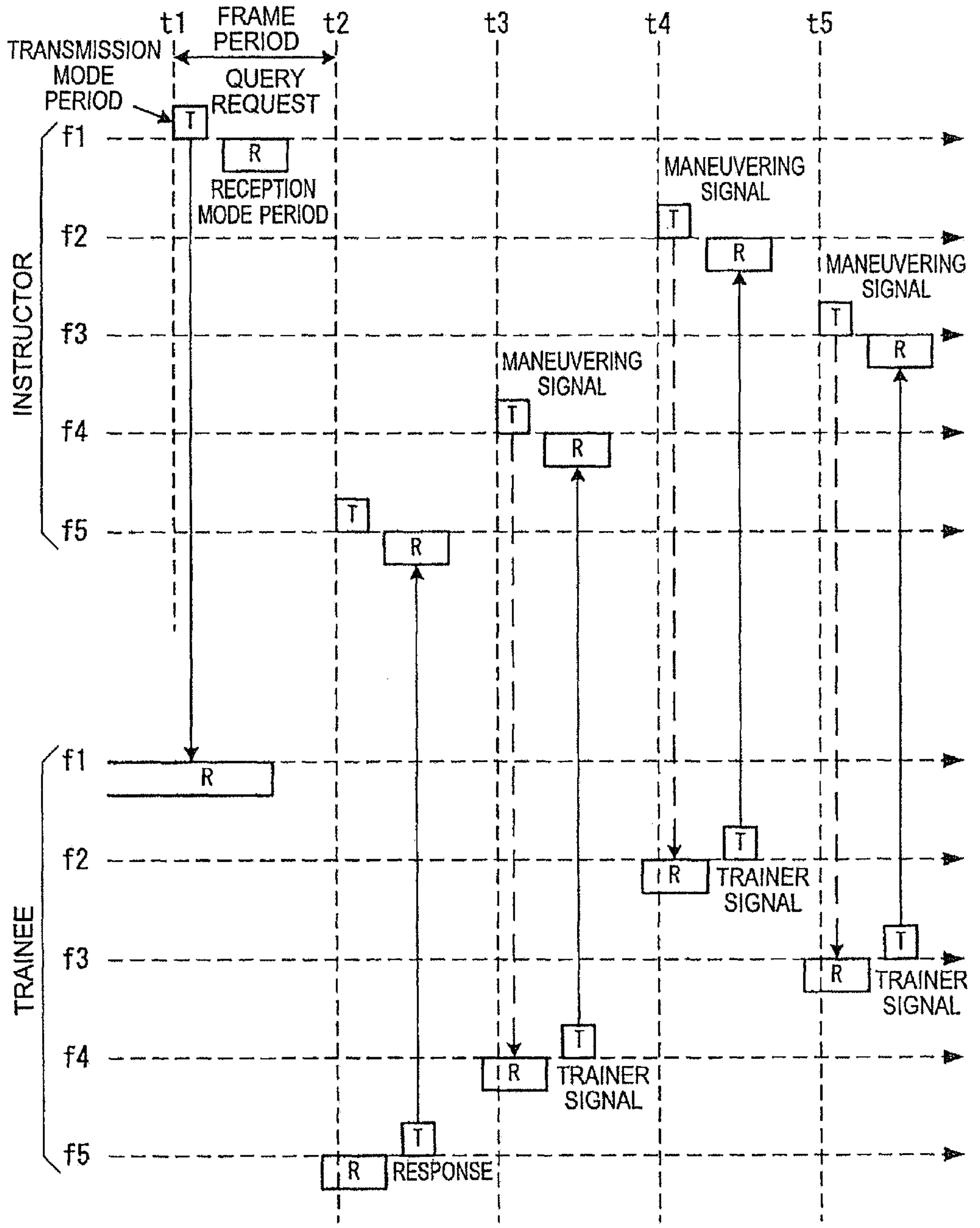
FIG. 9 is a diagram illustrating signal transmission and reception in the trainer mode between the instructor's radio control transmitter and the trainee's radio control transmitter according to one embodiment of the present invention.
Figure 10:
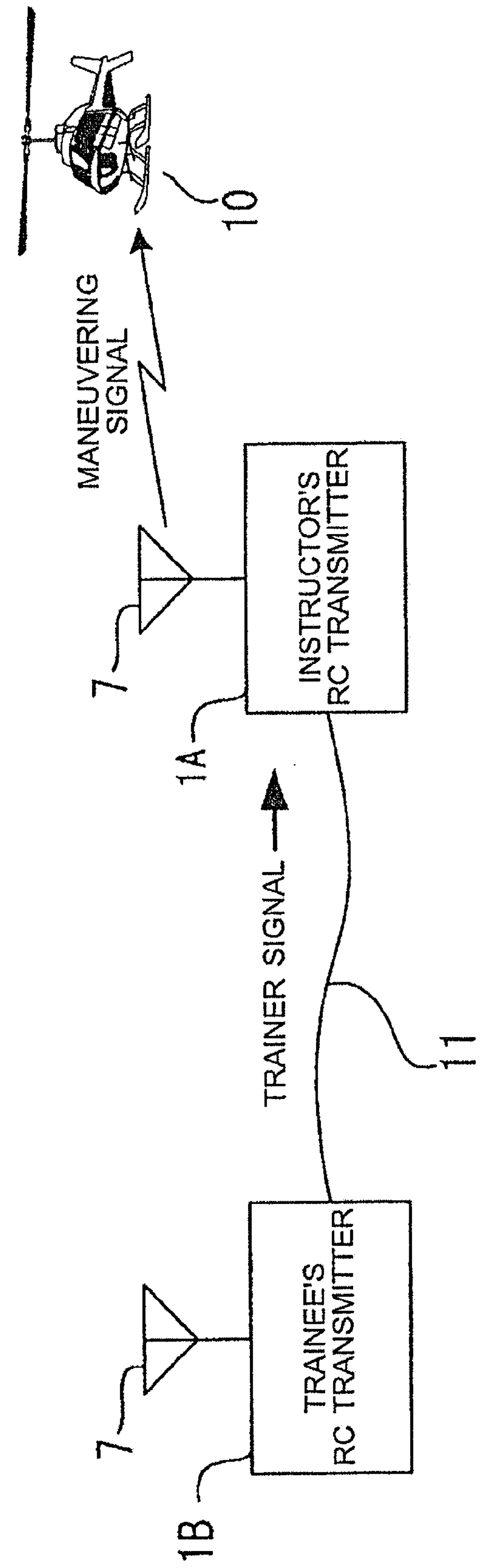
FIG. 10 PRIOR ART
FIG. 10 is an exemplary conventional device configuration supporting trainer features (in which a trainer cable is used).
Figure 11:
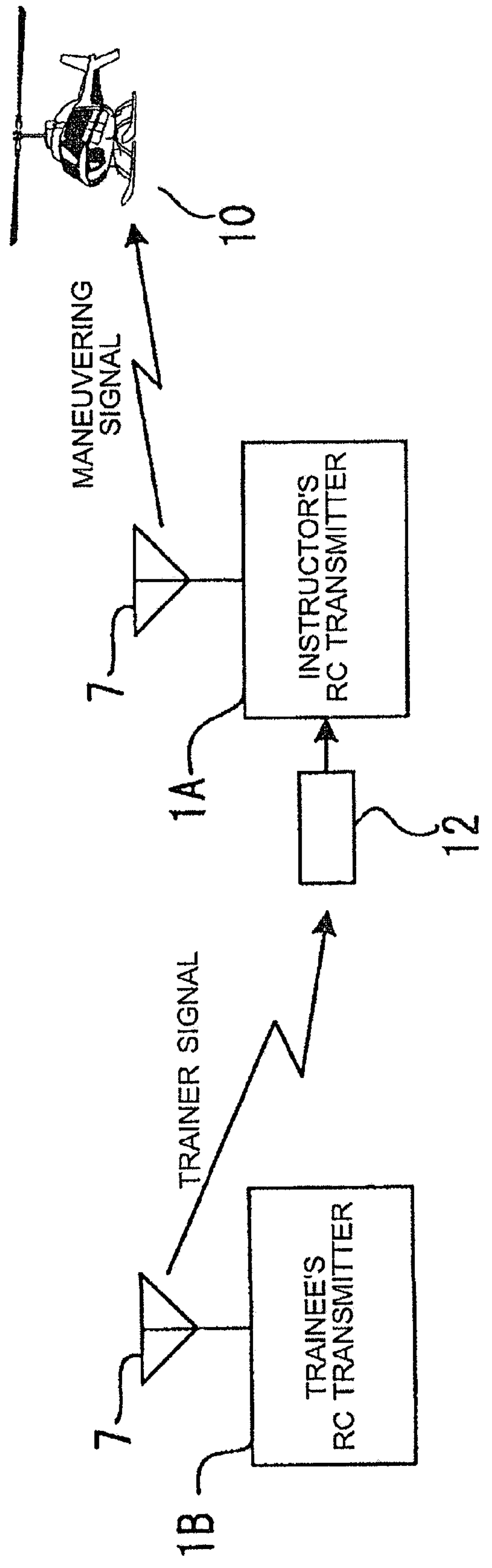
FIG. 11 PRIOR ART
FIG. 11 is an exemplary conventional device configuration supporting the trainer features (in which a trainer signal receiver is used).
Figure 12:
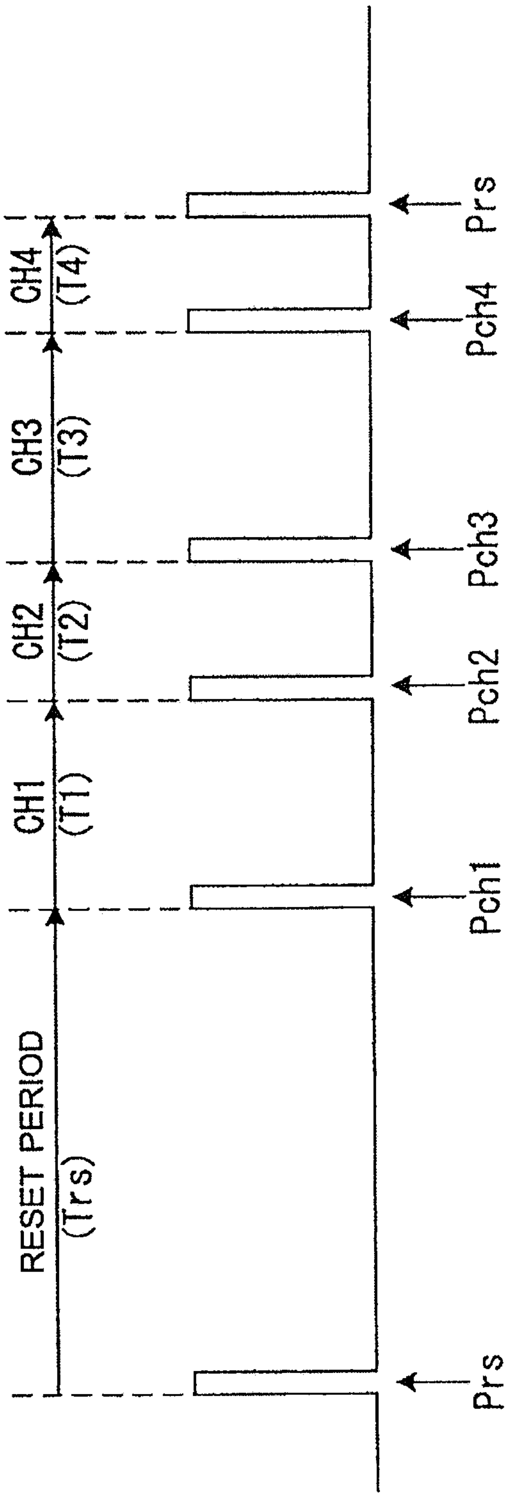
FIG. 12 PRIOR ART
FIG. 12 illustrates a format of a maneuvering signal and a trainer signal in the form of a PPM signal.

This means that, as shown in FIG. 9, the transmission timing of the maneuvering signal in the instructor's radio control transmitter 1A substantially coincides with the start timing of the frame period. Accordingly, in the step S408, the trainee's radio control transmitter 1B identifies the instructor's frame timing on the basis of the timing at which the maneuvering signal was received. Further, on the basis of the identified frame timing, the trainee's radio control transmitter 1B synchronizes its own frame timing with that of the instructor's radio control transmitter 1A for the frame period adjustment.

The synchronization of the frame timing in this context means that the reception mode period and the transmission mode period of the trainee's radio control transmitter 1B in the frame period are synchronized with the transmission mode period and the reception mode period of the instructor's radio control transmitter 1A in the frame period. In fact, by virtue of the processing in the step S408, the trainee's radio control transmitter 1B correct and adjust the timings of the reception mode period and the transmission mode period with respect to those of the instructor's radio control transmitter 1A.

Referring to FIG. 9, there is shown an example of transmission and reception timings of the signal corresponding to the procedures of FIG. 8. In this figure too, in a similar manner as in FIG. 6, the frequencies serving as the hopping channels are the frequencies f1 to f5. Also, in FIG. 9, the transmission and reception operation of the instructor's radio control transmitter 1A is shown in the upper region (the INSTRUCTOR portion) and the transmission and reception of the trainee's radio control transmitter 1B is shown in the lower region (in the TRAINEE portion).

It is assumed in FIG. 9 that, in the trainer mode, the instructor's radio control transmitter 1A (i.e., the INSTRUCTOR portion) continuously switches the frequencies for each frame period in accordance with the specified frequency hopping pattern. As shown in FIG. 9, the frequencies f1, f5, f4, f2, and f3 occur in this order as the frequency hopping pattern in a similar manner as in the example of FIG. 6.

Further, the instructor's radio control transmitter 1A in the trainer mode specifies the transmission mode period T and the reception mode period R within the one frame period, which differs from the normal maneuvering signal transmission of FIG. 6.

The transmission mode period and the reception mode period in the instructor's radio control transmitter 1A in FIG. 9 can be regarded as being specified by time division scheme within the one single frame period.

Specifically, in the one frame period, the transmission mode period T is set after lapse of a predetermined period of time from the starting time of the same one frame period. Next, the reception mode period R is set by the predetermined period of time after a predetermined interval following termination of the transmission mode period.

Further, in the illustrated case of FIG. 9, it is assumed that the instructor's radio control transmitter 1A, switched the frequencies for each frame period in the step S302 of FIG. 8 in accordance with the specified frequency hopping pattern prior to the frame period starting from the time point t1. and repeatedly transmitted the query request in the manner as in the frame period 1.

Also, it is assumed in FIG. 9 that the trainee's radio control transmitter 1B (i.e., the TRAINEE portion in FIG. 9) continued the reception mode period with the fixed frequency f1 in the step S402 from a time point prior to the time point t1 in FIG. 9 on, it is assumed that the reception mode period continues with fixed frequency f1.

Further, as shown in FIG. 9, at the timing at which the frame period starting from the time point t1 is started, the instructor's frequency and the trainee's frequency coincide with each other and the query request has been received by the trainee's radio control transmitter 1B.

In response to this query request, the trainee's radio control transmitter 1B in FIG. 9 will obtain an affirmative judgment Y in the step S404 in FIG. 8. In the step S405, the communications mode of the trainee's radio control transmitter 1B is switched to the frequency hopping mode brought into synchronization with the instructor, and the response is transmitted in the step S405.

In FIG. 9, the trainee's frequency hopping mode corresponding to the step S405 is performed in the frame period starting from the time point t2 and the frame period that follow.

Further, as shown in the frame periods following the time point t2, when the trainee's radio control transmitter 1B performs communications in the frequency hopping mode in the trainer mode, the reception mode period and the transmission mode period that follows are set by the time division in the one frame period. This means that in an order opposite that of the instructor, for the one frame period, first, a predetermined length of reception mode period is set corresponding to the start timing, and subsequently, after lapse of a predetermined period of time, a predetermined length of the transmission mode period is set. Thus, as can be appreciated from the INSTRUCTOR and TRAINEE portions of FIG. 9 illustrating the frame periods following the time point t2, the transmission mode period of the instructor's radio control transmitter 1A occurs at the timing within the reception mode period of the trainee's radio control transmitter 1B, so that the transmission signal from the instructor's radio control transmitter 1A is received by the trainee's radio control transmitter 1B.

Likewise, in the reception mode period of the trainee's radio control transmitter 1B, the timing of the transmission mode period of the instructor's radio control transmitter 1A is set so that the transmission signal from the trainee's radio control transmitter 1B can be received by the instructor's radio control transmitter 1A.

With regard to the reception mode period, as shown in FIG. 9, a length of time longer than the transmission mode period is specified both in the instructor's radio control transmitter 1A and in the trainee's radio control transmitter 1B, and both of the start timing of the reception mode precedes the start timing of the corresponding transmission mode period, and likewise the end timing of the reception mode period comes after the end timing of the corresponding transmission mode period. Accordingly, the reception mode period of the trainee's radio control transmitter 1B is started prior to the frame period in which the transmission mode period of the instructor's radio control transmitter 1A is started at the beginning of the frame period.

Thus, in a state where the synchronization has been established, the transmission mode period of a transmitting device falls within the reception mode period of the receiving device, and thus the transmitted data can be effectively received.

Still referring to FIG. 9, the transmission of the response from the trainee's radio control transmitter 1B in the step S406 is performed in the transmission mode period within the frame period of the time point t2. In response to this, the instructor's radio control transmitter 1A, in the step S303, receives the response with the reception mode period within the frame period of the same time point t2.

In this case, on the side of the instructor's radio control transmitter 1A, as the processing of the step S304 corresponding to reception of the response, an affirmative judgment result is obtained, and the process goes to the step S305 and the steps that follow.

Further, on the side of the instructor's radio control transmitter 1A, for each frame period after the time point t3 and thereafter following the frame period from the time point t2, at the transmission mode period, the processing corresponding to the steps S305 to S307 of transmission of the maneuvering signal is repeatedly performed.

Here, the maneuvering signal transmitted from the instructor's radio control transmitter 1A is originally the one that is transmitted to operate the radio-controlled object 10. However, as shown as step S407 of FIG. 8, also on the side of the trainee's radio control transmitter 1B, the maneuvering signal is received so as to correct by synchronization the frame timing (transmission mode period and the reception mode period.

The step S407 of the trainee's radio control transmitter 1B for reception of the maneuvering signal is, as illustrated in FIG. 9, performed in the reception mode period for each frame period after the time point t3. In this manner, the maneuvering signal is, transmitted and received between the instructor's radio control transmitter 1A and the trainee's radio control transmitter 1B. Further, although not shown in this figure, even when the frame timings (timings of the reception mode period and the transmission mode period) set in the trainee's radio control transmitter 1B has an error with respect to the frame timings of the instructor's radio control transmitter 1A, the error is corrected at the timing corresponding to the frame period.

Also, on the trainee's radio control transmitter 1Bs side, as the processing corresponding to the step S409, in the transmission mode period for each of the frame periods following the time point t3, the trainer signal is transmitted and output. The reception of the trainer signal on the side of the instructor's radio control transmitter 1A corresponding to the step S308 is, likewise, performed for the reception mode period in teach of the frame periods following the time point t3. In this manner, the trainer signal are transmitted and received from the trainee's radio control transmitter 1B to the instructor for each frame period.

The transmission and reception of the maneuvering signal and the trainer signal in the trainer mode between the instructor's radio control transmitter 1A and the trainee's radio control transmitter 1B may be alternately performed for each frame period. In this case, for one frame period, the instructor's radio control transmitter 1A sets the transmission mode period and the trainee's radio control transmitter 1B sets the reception mode period, and the maneuvering signal is transmitted and received. In the next frame period, the trainee's radio control transmitter 1B sets the transmission mode period and the instructor's radio control transmitter 1A sets the reception mode period, and the trainer signal is transmitted and received. This two-frame operation is repeatedly performed.

In this two-frame operation, the maneuvering signal is transmitted once for the two frame periods. In view of the responsiveness of the radio-controlled object 10 to the maneuvering operation, it is preferable that the maneuvering signal be transmitted for one frame period to improve reliability of transmission. Also, in this case, since the trainer signal also transmitted once for the two frame periods, the same discussion applies with regard to the responsiveness.

To address the above-described responsiveness problem, this embodiment, as show in FIG. 9, sets the transmission mode period and the reception mode period within one frame period, so that transmission and reception of the maneuvering signal and the trainer signal are performed for each one frame.

For example, as shown in FIG. 6, even when the maneuvering signal is transmitted in the normal mode, the transmission mode period for that only occupies part of time belonging to the one frame period. As a result, the actual one frame period includes considerable amount of unoccupied time.

According to this embodiment, taking advantage of this unoccupied time, as shown in FIG. 9, the transmission mode period and the reception mode period are by the time division within the one frame period. Thus, although this embodiment is subject to the condition that both the instructor's radio control transmitter 1A and the trainee's radio control transmitter 1B should transmit and receive the maneuvering signal and the trainer signal in the same 2.4 GHz band, the maneuvering signal and the trainer signal can be transmitted and received as often as hitherto. Accordingly, responsiveness and the stability regarding the maneuvering operation of the radio-controlled object 10 are not degraded.

Also, in FIG. 9, when setting the transmission mode period and the reception mode period within the one frame period, the instructor's radio control transmitter 1A sets the transmission mode period first and then the reception mode period, and the trainee's radio control transmitter 1B the reception mode period first and then the transmission mode period. This is, in fact, as shown in FIG. 6, due to the fact that transmission and reception of the maneuvering signal between the radio control transmitter 1 and the receiver 11 of the radio-controlled object 10 are performed in accordance with the start timing of the frame period. Specifically, in this embodiment, setting of transmission mode period and the reception mode period in the frame period should be provided in accordance with the transmission and reception of the maneuvering signal timing already established between the radio control transmitter 1 and the receiver 11.

The above description assumes that the communications are made with the 2.4 GHz band. However, this embodiment can also be configured with other radio communications system.

Also, in the illustration of FIGS. 8 and 9, the trainee's radio control transmitter 1B receives the maneuvering signal in each frame period. However, the maneuvering signal does not need to be corrected by the synchronization as long as the synchronization of the first hopping pattern and time control of the following frame period switching are highly accurate. This means that the trainee's radio control transmitter 1B in the trainer mode of this embodiment may only transmit the trainer signal in each frame period while not proactively receiving a signal regardless of the fact that the reception mode period is provided. Also, the trainee's radio control transmitter 1B may receive the maneuvering signal once in a plurality of frames or intermittently for correction by synchronization.

Further, the trainer features of this embodiment can be readily implemented both in a case where the trainee's radio control transmitter 1B and the instructor's radio control transmitter 1A are the same type and in a case where they are different types having different specs, as long as the communications features of the instructor's radio control transmitter 1A and the trainee's radio control transmitter 1B shown in FIGS. 8 and 9 are supported.

While the exemplary embodiment of the present invention has been described by way of example, it will be appreciated by those skilled in the art may make various modifications in the light of the above teaching and within the scope and sprit of the present invention, and the scope of the invention is to be defined by the claims appended hereto.

What is claimed is:

1. A radio control transmitter comprising:

(a) a transmission unit configured to transmit a signal via radio communication;

(b) a reception unit configured to receive a signal via the radio communication; and (c) a transmission and reception control unit configured to set a transmission mode period and a reception mode period in each of frame periods, wherein a frequency is switched by frequency hopping on a per-frame-period basis; control the transmission unit to transmit a first signal to an other radio control transmitter of a communication partner in the transmission mode period; and control the reception unit to receive a second signal transmitted by the other radio control transmitter of the communication partner in the reception mode period, wherein, when a function of an instructor's radio control transmitter is enabled, the transmission and reception control unit is further configured to control the reception unit to receive a trainer signal as the second signal from the other radio control transmitter of the communication partner, the trainer signal containing maneuvering information corresponding to maneuvering operation directed to the other radio control transmitter of the communication partner; and is configured to control the transmission unit to transmit a direct maneuvering signal as the first signal to a receiver of a radio-controlled object for controlling the radio-controlled object, the direct maneuvering signal containing the maneuvering information contained in the trainer signal received by the reception unit.

2. The radio control transmitter as set forth in claim 1, wherein, when a passive mode is enabled for the function of the instructor's radio control transmitter, the transmission and reception control unit is further configured to transmit the direct maneuvering signal as the first signal to the receiver of the radio-controlled object, the direct maneuvering signal containing the maneuvering information of the trainer signal received by the reception unit, and, when an active mode is enabled for the function of the instructor's radio control transmitter, the transmission and reception control unit is further configured to transmit a direct maneuvering signal as the first signal to the receiver of the radio-controlled object, the direct maneuvering signal containing maneuvering information corresponding to maneuvering operation directed to the radio control transmitter.

3. A radio transmitter comprising:

(a) a transmission unit configured to transmit a signal via radio communication;

(b) a reception unit configured to receive a signal via the radio communication; and (c) a transmission and reception control unit configured to set a transmission mode period and a reception mode period in each of frame periods, wherein a frequency is switched by frequency hopping on a per-frame-period basis; control the transmission unit to transmit a first signal to an other radio control transmitter of a communication partner in the transmission mode period; and control the reception unit to receive a second signal transmitted by the other radio control transmitter of the communication partner in the reception mode period, wherein, when a function of a trainee's radio control transmitter is enabled, the transmission and reception control unit is further configured to set the transmission mode period within each of the frame periods at a timing corresponding to the reception mode period set by the other radio control transmitter of the communication partner in which the function of the trainee's radio control transmitter is enabled, and is further configured to transmit a trainer signal as the first signal to the other radio control transmitter of the communication partner, the trainer signal containing the maneuvering information corresponding to the maneuvering operation directed to the radio control transmitter.

4. The radio control transmitter as set forth in claim 3, wherein the transmission and reception control unit is further configured to set the reception mode period within each of the frame periods at a timing corresponding to a transmission mode period set by the other radio control transmitter of the communication partner in which the function of the instructor's radio control transmitter is enabled, and is further configured to receive as the second signal a direct maneuvering signal transmitted from the other radio control transmitter of the communication partner, the direct maneuvering signal being further received by the receiver of the radio-controlled object for controlling the radio-controlled object.

5. The radio control transmitter as set forth in claim 3, further comprising a synchronization and adjustment unit configured to perform synchronization of the timing of the frame periods of the radio control transmitter with frame periods of the other radio control transmitter of the communication partner, the synchronization being made based on a timing at which the direct maneuvering signal has been received.

6. A method for communication in a radio control transmitter, comprising the steps of:

(a) setting a transmission mode period and a reception mode period within each of frame periods by which a frequency is switched by frequency hopping;

(b) in the transmission mode period, transmitting a first signal to an other radio control transmitter of a communication partner, wherein the first signal is transmitted by a transmission unit adapted to perform signal transmission via radio communication; and (c) in the reception mode period, receiving a second signal transmitted from the other radio control transmitter of the communication partner via the radio communication, wherein the second signal is received by a reception unit adapted to perform signal reception via the radio communication, (d) when a function of an instructor's radio control transmitter is enabled, controlling the reception unit to receive a trainer signal as the second signal from the other radio control transmitter of the communication partner by the transmission and reception control unit, the trainer signal containing maneuvering information corresponding to maneuvering operation directed to the other radio control transmitter of the communication partner; and is configured to control the transmission unit to transmit a direct maneuvering signal as the first signal to a receiver of a radio-controlled object for controlling the radio-controlled object, the direct maneuvering signal containing the maneuvering information contained in the trainer signal received by the reception unit.

7. A method for communication in a radio control transmitter, comprising the steps of:

(a) setting a transmission mode period and a reception mode period within each of frame periods by which a frequency is switched by frequency hopping;

(b) in the transmission mode period, transmitting a first signal to an other radio control transmitter of a communication partner, wherein the first signal is transmitted by a transmission unit adapted to perform signal transmission via radio communication; and (c) in the reception mode period, receiving a second signal transmitted from the other radio control transmitter of the communication partner via the radio communication, wherein the second signal is received by a reception unit adapted to perform signal reception via the radio communication, (d) when a function of a trainee's radio control transmitter is enabled, setting the transmission mode period within each of the frame periods at a timing corresponding to the reception mode period set by the other radio control transmitter of the communication partner in which the function of the trainee's radio control transmitter is enabled, and transmitting a trainer signal as the first signal to the other radio control transmitter of the communication partner, the trainer signal containing the maneuvering information corresponding to the maneuvering operation directed to the radio control transmitter.

* * * * *

UNITED STATES PATENT AND TRADEMARK OFFICE

CERTIFICATE OF CORRECTION

PATENT NO. : 8,432,950 B2
APPLICATION NO. : 12/883855
DATED : April 30, 2013
INVENTOR(S) : Masahiro Tanaka et al.

It is certified that error appears in the above-identified patent and that said Letters Patent is hereby corrected as shown below:

In the Specifications:

Column 10, line 17, "13" should be --f3--

Signed and Sealed this
Eighteenth Day of June, 2013

Teresa Stanek Rea
*Acting Director of the United States Patent and Trademark Office*